United States Patent
Sharma et al.

(10) Patent No.: US 10,379,502 B2
(45) Date of Patent: Aug. 13, 2019

(54) CONTROL SYSTEM WITH MACHINE LEARNING TIME-SERIES MODELING

(71) Applicant: ACCENTURE GLOBAL SOLUTIONS LIMITED, Dublin 4 (IE)

(72) Inventors: Sanjay Sharma, New Delhi (IN); Nilesh Kumar Gupta, New Delhi (IN); Samik Adhikary, Gurgaon (IN); Pinaki Asish Ghosh, Gurgaon (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 621 days.

(21) Appl. No.: 15/170,657

(22) Filed: Jun. 1, 2016

(65) Prior Publication Data

US 2017/0293269 A1 Oct. 12, 2017

(30) Foreign Application Priority Data

Apr. 11, 2016 (IN) .............................. 201641012582

(51) Int. Cl.
*G06N 5/04* (2006.01)
*G05B 13/02* (2006.01)
*G05B 13/04* (2006.01)

(52) U.S. Cl.
CPC ......... *G05B 13/028* (2013.01); *G05B 13/048* (2013.01); *G06N 5/04* (2013.01)

(58) Field of Classification Search
CPC ...................................................... G06N 5/04
USPC ........................................................... 706/45
See application file for complete search history.

(56) References Cited

U.S. PATENT DOCUMENTS

| 2005/0084907 A1 | 4/2005 | Fox |
| 2014/0074614 A1* | 3/2014 | Mehanian .......... G06Q 30/0267 |
| | | 705/14.64 |
| 2015/0339572 A1* | 11/2015 | Achin .................... G06N 5/02 |
| | | 706/46 |

FOREIGN PATENT DOCUMENTS

| WO | 2006/017153 | 2/2006 |
| WO | 2010/080146 | 7/2010 |
| WO | 2015/149035 | 10/2015 |

OTHER PUBLICATIONS

Robert A. Jacobs "Bias/Variance Analyses of Mixtures-of-Experts Architectures" (Year: 1997).*
Yadav et al "A SOM-based hybrid linear-neural model for short-term load forecasting" (Year: 2011).*
Magness, T. A., et al., "Comparison of least squares and minimum variance estimates of regression parameters." The Annals of Mathematical Statistics (1962), pp. 462-470.

* cited by examiner

*Primary Examiner* — Lut Wong
(74) *Attorney, Agent, or Firm* — Mannava & Kang, P.C.

(57) ABSTRACT

An unsupervised machine learning model can make prediction on time series data. Variance of time-varying parameters for independent variables of the model may be restricted for continuous consecutive time intervals to minimize overfitting. The model may be used in a control system to control other devices or systems. If predictions for the control system are for a higher granularity time interval than the current mode, the time-varying parameters of the model are modified for the higher granularity time interval.

18 Claims, 13 Drawing Sheets

700 a best likelihood estimate, a best case estimate, and a worst case estimate is determined for the β's of the independent variable for which the higher granularity is needed and the time periods t
701 one of the best likelihood estimates, the best case estimates, and the worst case estimates of the β's is used as the modified β's
702

FIG. 7

CONTROL SYSTEM WITH MACHINE LEARNING TIME-SERIES MODELING

PRIORITY

The present application claims priority to Indian patent application number 201641012582, having a filing date of Apr. 11, 2016, the disclosure of which is hereby incorporated by reference in its entirety.

TECHNICAL FIELD

Embodiments of the present application are directed to artificial intelligence type computers and digital data processing systems and corresponding data processing methods for emulation of intelligence, including unsupervised machine learning for model generation and control systems.

BACKGROUND

In a broad sense, artificial intelligence includes a large number of intelligent computing methodologies and technologies that are capable of intelligent behavior. Artificial intelligence is currently being used for a variety of applications, including industrial plant automation, natural language processing and a variety of engineering applications. Some examples of artificial intelligence technologies include neural networks, fuzzy logic computation, genetic algorithms, and their combinations.

One aspect of artificial intelligence or computational intelligence technologies includes time series forecasting, whereby forecasts or predictions may be determined based on processing and analyzing of time-based historic data sets. For example, time-based historic data sets may be analyzed to make predictions, such as to predict network usage, to predict weather events, to predict online user behavior, etc. Time series forecasting is used for a variety of different applications, especially in "big data" environments.

BRIEF DESCRIPTION OF DRAWINGS

The embodiments are described in detail in the following description with reference to examples shown and described with respect to the following figures:

FIG. 7 illustrates a flow chart of an example of a method for modifying a time varying parameter to facilitate making predictions for a higher granularity time interval;

DETAILED DESCRIPTION OF EMBODIMENTS

Figure 1:
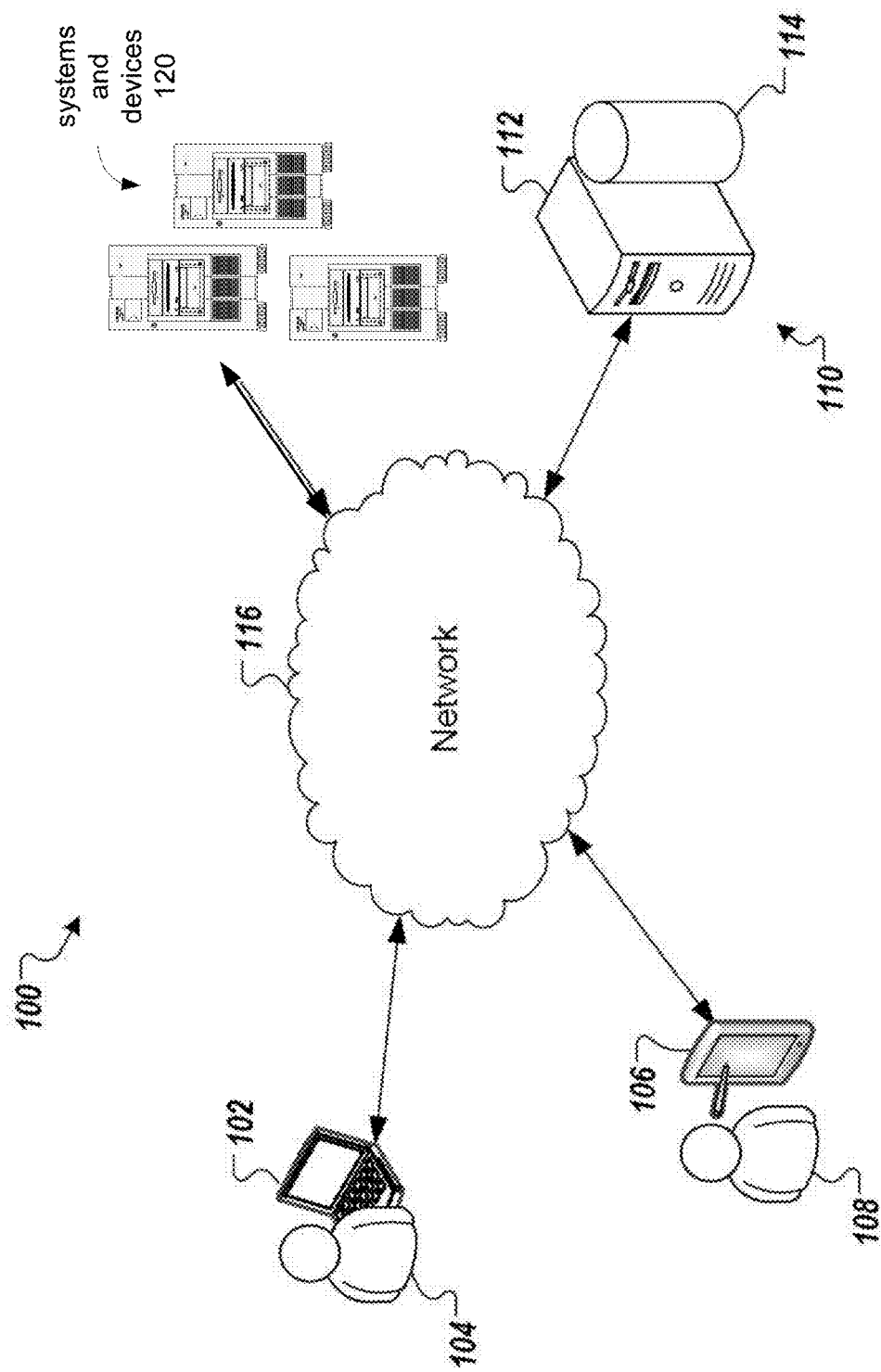
FIG. 1 illustrates a block diagram of an example of a system that can execute implementations of the present disclosure.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, artificial intelligence, such as unsupervised machine learning, may be used to generate a time series forecasting model for generating predictions on time series data. The time series forecasting model, also referred to herein as the model, may be built from time series historic data sets. The historic data sets may include time series data. Time series data is a sequence of data points, such as successive measurements made over a successive time intervals, and each time interval may be the same length, such as measurements for each minute, measurements for each hour, measurements for each day, measurements for each week, etc. Each time interval may have a single data point or measurement.

According to an embodiment, the time series forecasting model may be built using unsupervised machine learning. Unsupervised machine learning may include a machine learning function that can draw inferences from data sets that are without labeled responses. Examples of machine learning functions for unsupervised machine learning are described below, and use the time series historic data sets to generate the time series forecasting model.

The time series forecasting model can generate predictions for consecutive time intervals, which may be successive time intervals of the time series historic data. For example, if the successive time intervals of the time series historic data is hourly, then the model may generate predictions of a dependent variable of the model for each of consecutive hours (i.e., hourly). The consecutive time intervals may include time periods of fine granular levels, such as hourly or some other time periods which may be less than daily.

Also, according to an embodiment, the model can be used to make predictions for consecutive time intervals that are larger than the successive time intervals of the time series historic data. For example, if the successive time intervals of the time series historic data is hourly, the model may be adjusted as needed to make predictions for daily or weekly consecutive time periods. For example, granularity or granular level refers to the length of time of each interval, which may be the same for each interval, such as hourly, weekly, daily, etc. The lowest granularity is the shortest interval length (e.g., hourly) but predictions may be needed for a higher granularity (e.g., a longer interval length), such as daily or weekly. The system can make predictions for higher granularities as requested.

The model predictions may be used in a control system comprised of a device or multiple devices which manage, command, direct and/or regulate other devices and systems. The control system may include a distributed system, including a data warehouse or other storage system, receiving and storing data. For example, the data may be captured from devices, sensors, etc., in real time on high-bandwidth, low-latency data networks and stored in the data warehouse. The control system may include an unsupervised machine learning modeling system, and the model generated by the system, to generate predictions for fine granular time periods. The predictions may be used to manage, command, direct and/or regulate the other devices and systems in real-time.

A technical problem that can be associated with predictive models is their inability to make accurate predictions for use in a real-time environment. Often, the predictive models may over estimate or under estimate the effectiveness of independent variables in predicting a dependent variable because of their lack of tunability, especially for predictions being made for fine-grained time periods. As a result, it may not be possible to use the predictions to control other systems, such as industrial systems, network systems, online content delivery systems, etc., that may require real-time decision making and control based on the predictions. As explained in further detail below, a model generated by the unsupervised machine learning modeling system can have the capability to make accurate predictions for fine-grained time periods, and can be used in a control system for real-time control of other systems and devices.

Another technical problem is overfitting. In machine learning, overfitting occurs when a model describes random error or noise instead of the underlying relationships between independent variables and the dependent variable for which predictions are made based on the relationships. A model that has been overfit will generally have poor predictive performance. According to an embodiment, during model building, variability of coefficients for consecutive time periods may be restricted to minimize overfitting and improve prediction performance of the model. As a result, more accurate models may be built that better lend themselves to use in the control system to control other systems and devices based on the model's predictions.

FIG. 1 depicts an example of a system 100 in which implementations of the present disclosure may be implemented. In the system 100 of FIG. 1, computing device 102, operated by user 104, and computing device 106, operated by user 108, may be used to provide some inputs for model creation and application of the model, as is further described below, and to perform user input/output operations and data visualization operations that allow the user to explore and interact with data.

The system 100 may include one or more servers, including artificial intelligence server 112, and a data storage system 114 including one or more storage devices storing machine-readable instructions and data sets for model building and predictions. The artificial intelligence server 112 for example performs the unsupervised machine learning to generate the model for time series predictions, and can apply the model to data sets to generate predictions. The artificial intelligence server 112 and other servers of the system 110 may perform other computational operations and control operations which are described herein.

The data storage system 114 may include a data warehouse, database system, and/or other types of data storage systems. The data storage system 114 may receive and store data from one or more data sources. The data storage system 114 may create data sets of historic data to build the model and to validate the model. Also, the data may include data for which predictions are made by the mode. The predictions may be stored and used to control other systems and devices 120 in a control system. The data storage system 114 may store any data and information used by the system 100.

Also, the system 110 may use server-side information and processing to interact with the computing devices 102 and 106 (e.g., in real-time) as the computing devices 102 and 106 execute applications or web-based interfaces that interact with the users 104 and 108. The system 110 may communicate with the client devices 102 and 106 by any suitable communication medium, such as a communication network 116. As such, in some implementations, the system enables computation work to be sent to be done by external hardware (e.g., a supercomputer, a networked grid, etc.), which may, for example, provide greater computing resources that enable generating a large number of solutions relatively quickly. As an example, a user may perform data visualization on a mobile electronic device 102 and/or 106 (e.g., a laptop, an electronic tablet, etc.), while assigning computation jobs to be done by a remote system 110 (e.g., "in the cloud"). In some implementations, there may be one or more additional computing devices (e.g., device 118 in FIG. 1) operated by one or more other users (e.g., user 120 in FIG. 1) that perform parts of the clustering and evaluation process. Such users may, for example, work in conjunction with users 104 and/or 108 to perform different operations of clustering and evaluation.

The systems and devices 120 may include computers and/or devices that receive predictions or instruction based on predictions, which may be generated by the system 110, as input to control operations performed by the computers and/or devices. The systems and devices 120 may be part of a control system that includes the system 110. The model may describe the chronological dependence among sequential samples of independent variables and their relationships to a dependent variable being predicted by the model. The model can be used to generate predictions in a control system to manage, command, direct and/or regulate the systems and devices 120, including real-time management of the systems and devices 120.

According to an example, the systems and devices 120 may comprise an industrial system. For example, the systems and devices 120 may be part of a manufacturing plant. The input data set for which predictions are to be made by the model may include real-time sensor data that includes measurements of monitored manufacturing processes. If predictions generated by the model estimate that a process or device being manufactured will fall outside tolerances, alerts may be generated and corrective actions may be implemented by the systems and devices 120 to account for the out-of-tolerance predictions. One example of an industrial system that may implement a control system, including the time series forecasting model described herein, to perform real-time control of manufacturing processes includes semiconductor manufacturing. Delay in control of the manufacturing process for semiconductor manufacturing can result in the generation of chips that do not conform to specifications. For example, the input data for the model may include measurements for gas flow, power, temperature, etc. These measurements may be used by the model to predict when chips being generated may become non-conforming, and to generate alarms and perform corrective actions, such as reducing temperature by controlling cooling systems.

In another example, the systems and devices 120 may comprise a content delivery system, including delivery of content that may be online, such as over the Internet. For example, the systems and devices 120 may include servers performing content delivery driven by the predictions of the model. The model predicts the effectiveness of creatives, campaigns, and events, and considers discrete seasonal patterns to predict effectiveness. These predictions are used to manage, command, direct and/or regulate the systems and devices 120 to control content delivery. The content delivery control may include delivery of content on an hourly basis and thus may require real-time control of the content delivery. Also, delivery of content on a daily or weekly interval or some other time interval may be performed.

The computing devices 102, 106, 110, and 118 may be any suitable computing devices, such as laptop or desktop computers, smartphones, personal digital assistants, wearable computers, portable media players, tablet computers, or other appropriate computing devices that can be used to communicate with an electronic communication network. In addition, one or more of the computing devices 102, 106, 110, and 118 may perform client-side operations, as discussed in further detail herein.

Also, the computing system 110 may include one or more computing devices, such as a computer server. Further, the computing system 110 may represent more than one computing device working together to perform the server-side operations, as discussed in further detail herein. The network 116 may be a public communication network, e.g., the Internet, cellular data network, dialup modems over a telephone network, or a private communications network, e.g., private LAN, leased lines. The network 116 may include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, Wi-Fi, or other such transceiver.

Figure 2:
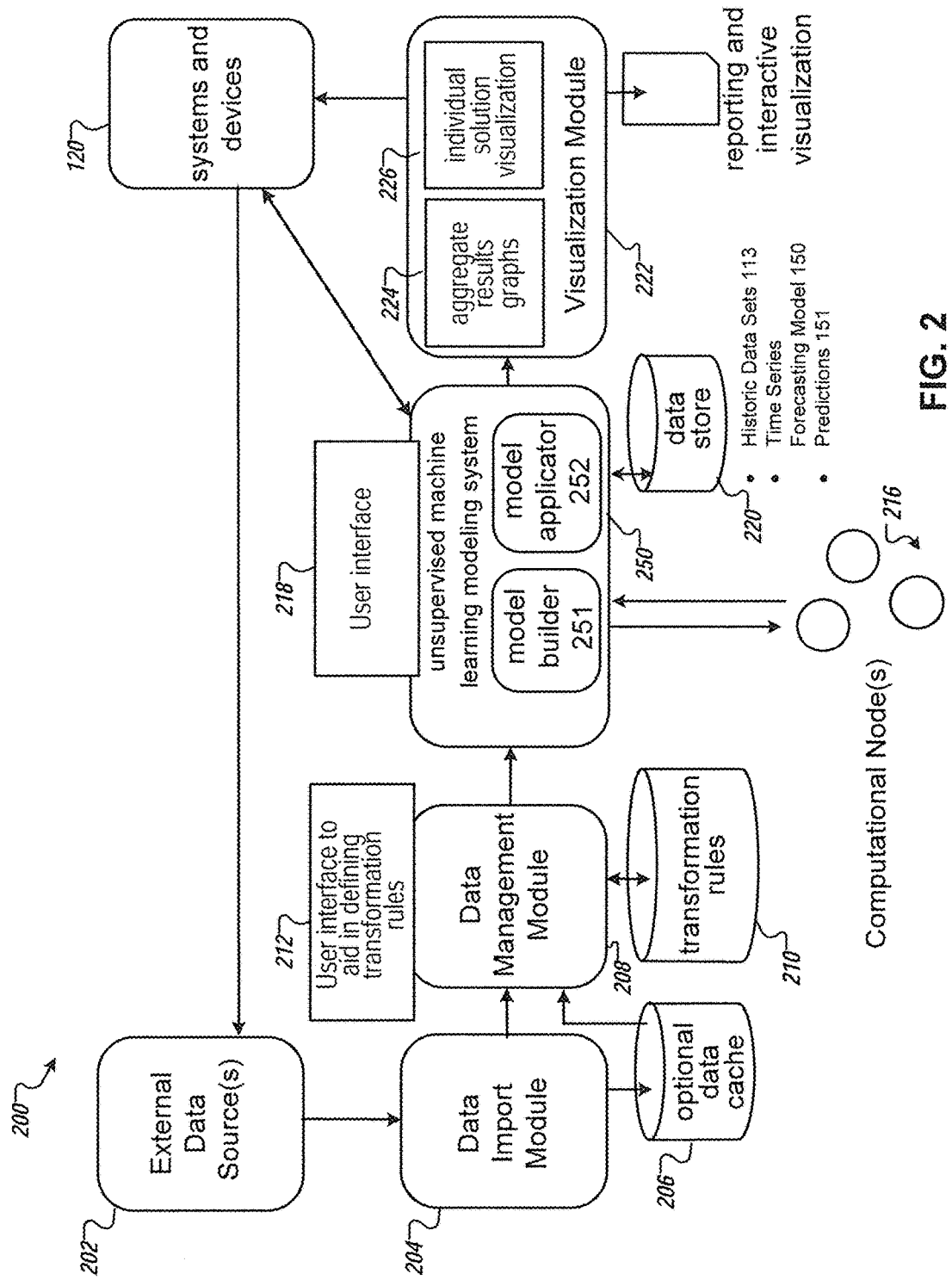
FIG. 2 illustrates an example of components of a system that can execute implementations of the present disclosure.

FIG. 2 illustrates an example of components of a system 200 that performs functions and operations described herein. The system 200 in FIG. 2 may be implemented in a distributed manner across multiple computers and systems (e.g., 102, 106, 110, 112, and/or 120 in FIG. 1). Components on separate computers may use any suitable communications technique to transmit data (represented by the arrows) between one another. For example, in some implementations, the system may be implemented as a distributed computing platform that coordinates the search and discovery of high-value segmentation strategies in data sets with large numbers of variables.

In the example of FIG. 2, data may be accessed from data source(s) 202 by data import module 204. The data may include time series data. In an example, the data received from the data source(s) 202 may include data measured or otherwise determined by sensors, computers, devices, etc. of the systems and devices 120. Although shown separately, the data source(s) 202 may include the systems and devices 120.

The data import module 204 may optionally store some or all (or none) of the data in a local data cache 206. The imported data may then be passed to a data management module 208 for processing prior to the generation of model 150, e.g., the time series forecasting model, or prior to applying the data as input to the model 150 to generate predictions. For example, the data management module 208 may organize the data by grouping, ordering, transforming, and/or "cleaning" the data in such a way to facilitate use of the data by unsupervised machine learning modeling system 250. The data management module 208 may use one or more transformation rules that specify one or more rules to apply to the data for processing. In some implementations, the transformation rules may be accessed from storage (e.g., from data store 210). Additionally or alternatively, the transformation rules may be input by a user. For example, the data management module 208 may provide a user interface 212 to a user that enables the user to specify one or more transformation rules.

The data management module 208 may also identify different types of variables, and separate the variables according to the identified type. At least some of the variables may be used as inputs to a modeling process performed by the unsupervised machine learning modeling system 250. In an example, the data management module 208 may generate one or more data sets of time series data for use by the unsupervised machine learning modeling system 250. For example, historic data sets of time series data, such as data sets comprised of a year of time series data or a multiple years of time series data, may be created and stored and used to build the model 150. The data sets may include model building data sets for building the model 150, and validation data sets to test the model 150. Also, real-time data received from the data source(s) 202 may be stored and sent to the unsupervised machine learning modeling system 250 to generate predictions on the real-time data, and the predictions may be used to control other devices and systems.

The data management module 208 sends the processed data, such as the historic data sets and real-time data, to the unsupervised machine learning modeling system 250 and/or stores the processed data in data storage system 114, including data store 220, so the processed data can be accessed by the unsupervised machine learning modeling system 250. Examples of the data stored in the data store 220 includes the historic data sets 113, the model 150 and predictions 151 generated by the model 150. The unsupervised machine learning modeling system 250 includes model builder 251 to build the model 150. The model builder 251 may apply an unsupervised machine learning function to generate the model 150. The model applicator 252 may apply the model 150 to generate the predictions 151. Operations performed by the model builder 251 and the model applicator 252 are further described below. In an example, the unsupervised machine learning modeling system 250 may be implemented in the artificial intelligence server 112. In an example, the artificial intelligence server 112 may include one or more computational nodes 216. The computational nodes 216 may be part of a distributed computer system and may include processors, servers, or other types of processing circuits or computers.

All or part of the functions and operations described throughout this application can be implemented as a computer storage medium encoded with a computer program, the computer program including machine readable instructions that are executable by one or more processors and stored on a non-transitory computer readable medium. All or part of the features described throughout this application can be implemented as an apparatus, method, or electronic system that can include one or more processing devices and memory to store executable instructions to implement the stated functions. In an example, the computational nodes 216 may include processors that execute machine readable instructions to perform the operations of the unsupervised machine learning modeling system 250.

The unsupervised machine learning modeling system 250 may also provide a user interface 218 that receives user inputs that may be used for model building and model application to generate predictions. The unsupervised machine learning modeling system 250 may provide the predictions to visualization module 222. The visualization module 222 may provide one or more user interfaces (e.g., an interface 224 showing aggregate results graphs, and/or an interface 226 showing individual solution visualization) to rapidly explore the generated predictions. The unsupervised machine learning modeling system 250 and the systems and devices 120 may be part of a control system. For example, the predictions generated by the model 150 are output to the systems and devices 120 to control operations that are impacted by the predictions, as is described above and as is further described below.

In some implementations, the interfaces 212, 218, 224, 226 may be custom-designed user interfaces that facilitate some portion of the overall activity and, in some cases, may be used by multiple users with different roles. As such a system according to the present disclosure may coordinate and facilitate a distributed process of cluster generation and evaluation, and streamline the tasks and roles that potentially involve the participation of multiple people.

The unsupervised machine learning modeling system 250 includes model builder 251 to build the time series forecasting model 150, which may be generated and stored in the data store 220 and accessed to make the predictions 151. An unsupervised machine learning function may be used to build the model. According to an example, the model 150 is a structural time series model, and includes a time-varying parameter ($\beta$), an independent time-varying variable (X) and a dependent time-varying variable (Y). The model 150 may include multiple independent variables $X_j$ that each contribute to the value of Y. The model 150 determines the effectiveness of the independent variable X to contribute to the dependent variable Y for a given time period t, and $\beta$ is associated with the effectiveness. Time period is also referred to as time interval. The time period t may represent successive time intervals of the time series historic data, such as hour 1, hour 2, hour 3, etc., or week 1, week 2, week 3, etc. The model builder 251 can adjust the time series forecasting model 150 for example by determining $\beta$ for the time period and adjusting $\beta$ based on factors discussed below. The time-varying parameter $\beta$ can be determined and stored for each time period. For example, the time-varying parameter $\beta$ may be determined for each hour in a day, or for each week in a year, etc. Constraints may be applied to restrict the variance of $\beta$ for consecutive intervals, which can minimize overfitting and improve model prediction performance.

Equation 1 represents an example of an unsupervised machine learning function to build the time series forecasting model 150.

$$Y_t = \mu_t + \gamma_t + v_t + \sum_{j=1}^{k} \beta_{jt} X_{jt} + \varepsilon_t \qquad \text{Equation 1}$$

$Y_t$ is the dependent variable for a time period t. The time period t may be a historic time period, such as week 13 in the previous calendar year. $Y_t$ may be included in historic data or calculated from historic data.

$\mu_t + \gamma_t + v_t$ represent a baseline contribution to $Y_t$. For example, the baseline contribution, also referred to as the baseline, may include a contribution to $Y_t$ that may not be contributed to by the independent variable X. For example, $\mu_t$ represents a trend parameter, $\gamma_t$ represents a seasonal parameter, and $v_t$ represents an autoregressive parameter that may represent random factors. The summed values for these parameters is the baseline. In one example, the baseline value may be determined based on a historic baseline for the same time period. The baseline may vary for each time period.

There may be multiple independent variables X that contribute to Y. The total number of independent variables is k, and $X_j$ whereby j is from 1 to k represents each of the independent variables. X is determine for each time interval t.

$$\sum_{j=1}^{k} \beta_{jt} X_{jt}$$

is referred to as the first term. $\beta$ is associated with the effectiveness of each independent variable $X_j$ to contribute to the value of Y for the given time period t. $\beta$ is determined for each independent variable and each time interval t.

$\varepsilon_t$ is an error parameter. $\varepsilon_t$ may represent an error associated with a difference between estimated sales and actual sales.

All the values of the time series forecasting model 150 may be known from the historic data known except for $\beta$, so equation 1 can be solved to determine the value of $\beta$. A Kalman filter may be used to solve the equation. The Kalman filter is a known function that uses a series of measurements observed over time, containing noise (random variations) and other inaccuracies, and produces estimates of unknown variables that tend to be more precise than those based on a single measurement alone. The Kalman filter operates recursively on streams of input data, such as the historic sales data and data for other variables to produce a statistically optimal estimate, such as the $\beta$'s. The Kalman filter is widely applied in time series analysis. $\beta$ is a variable that varies from time-period-to-time-period. $\beta$ may not be a predetermined value used for all time periods. Statistical analysis may be used to determine whether $\beta$ is accurate.

Figure 3:
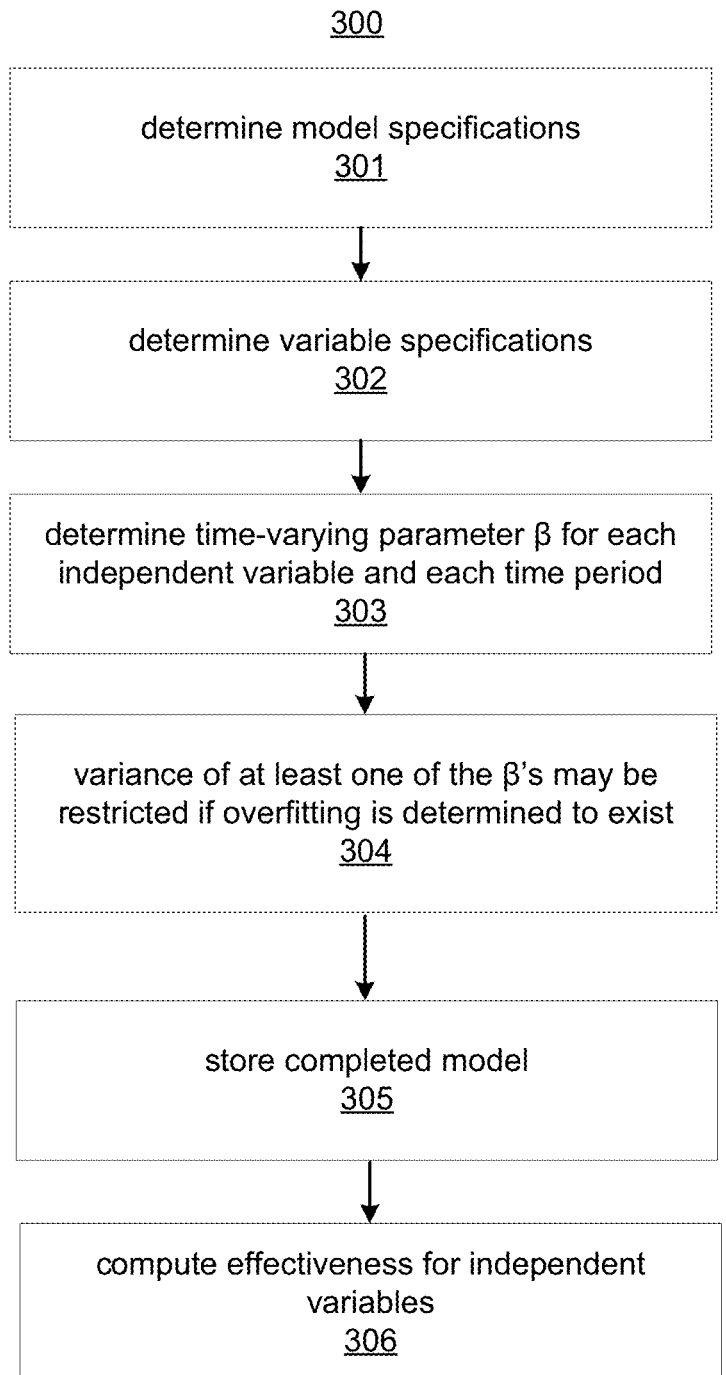
FIG. 3 illustrates a flow chart of an example of a method for model building.

FIG. 3 illustrates an example of method 300 for building a time series forecasting mode, such as the model 150. The method 300 and other methods described below may be performed by the systems shown in FIGS. 1-2 or other systems. In an example, the model builder 251 may build the model 150 according to the method 300.

At 301, model specifications are determined. For example, the function for generating the model 150 is selected and specifications for the model may be selected. An example of the selected function is equation 1. A data model in which the effects of individual factors are differentiated and added together to model the data. An example of model specifications may include additive or multiplicative. In a multiplicative model, the trend and seasonal components are multiplied and then added to the error component. Equation 2 is an example of a multiplicative model as follows:

$$Y_t = \mu_t \times \prod_{j=1}^{k} \beta_{jt} X_{jt} \times \varepsilon_t \qquad \text{Equation 2}$$

In Equation 2, instead of $\mu_t$ being used as the baseline, $\mu_t+\gamma_t+v_t$ may be used as the baseline similar to Equation 1. A user may select whether to use additive (e.g., Equation 1) or multiplicative (e.g., Equation 2) or it may be determined by a computer. In an example, the multiplicative model is selected when the magnitude of the seasonal pattern in the data depends on the magnitude of the data. In other words, the magnitude of the seasonal pattern increases as the data values increase, and decreases as the data values decrease. The additive model may be selected when the magnitude of the seasonal pattern in the data does not depend on the magnitude of the data.

At 302, variables specifications are determined. For example, the independent variables $X_j$ and the dependent variable Y are selected. A user may select the variables or it may be determined by a computer. Also, transformations may be selected for the independent variables. An example of transformations are AP transformations whereby A denotes carry-over impact and P denotes power to capture the diminishing return.

At 303, the time varying parameter, e.g., $\beta$, for the model is determined. As discussed above with respect to Equation 1, values for all the parameters of Equation 1 may be known from the historic data sets 113, and Equation 1 may be solved to determine $\beta$. $\beta$ is determined for each of the independent variables $X_j$ and for each time period t. For example, assume that the time period t is weekly. There are 52 weeks in a year, and 52 $\beta$'s are determined, one for each week. Also, the 52 $\beta$'s are determined for each of the independent variables $X_j$.

At 304, a variance of at least one of the $\beta$'s may be restricted if overfitting is determined to exist. An estimation of whether overfitting exists may be determined according to relative standard deviations and confidence intervals as described below with respect to the method 400. Also, an example of restricting $\beta$'s is described with respect to the method 400.

Once all the $\beta$'s are determined, the model 150 is completed at 305 and stored. The values for the model 150, including the values of all the $\beta$'s are stored to store the model 150. At 306, the effectiveness may be computed for the independent variables. The effectiveness for example is $\beta_{jt}X_{jt}$ and represents the amount of Y achieved as a result of X for the time period t. The stored model may be modified or re-built based on new historic data sets that are received and used to re-build the model.

Figure 4:
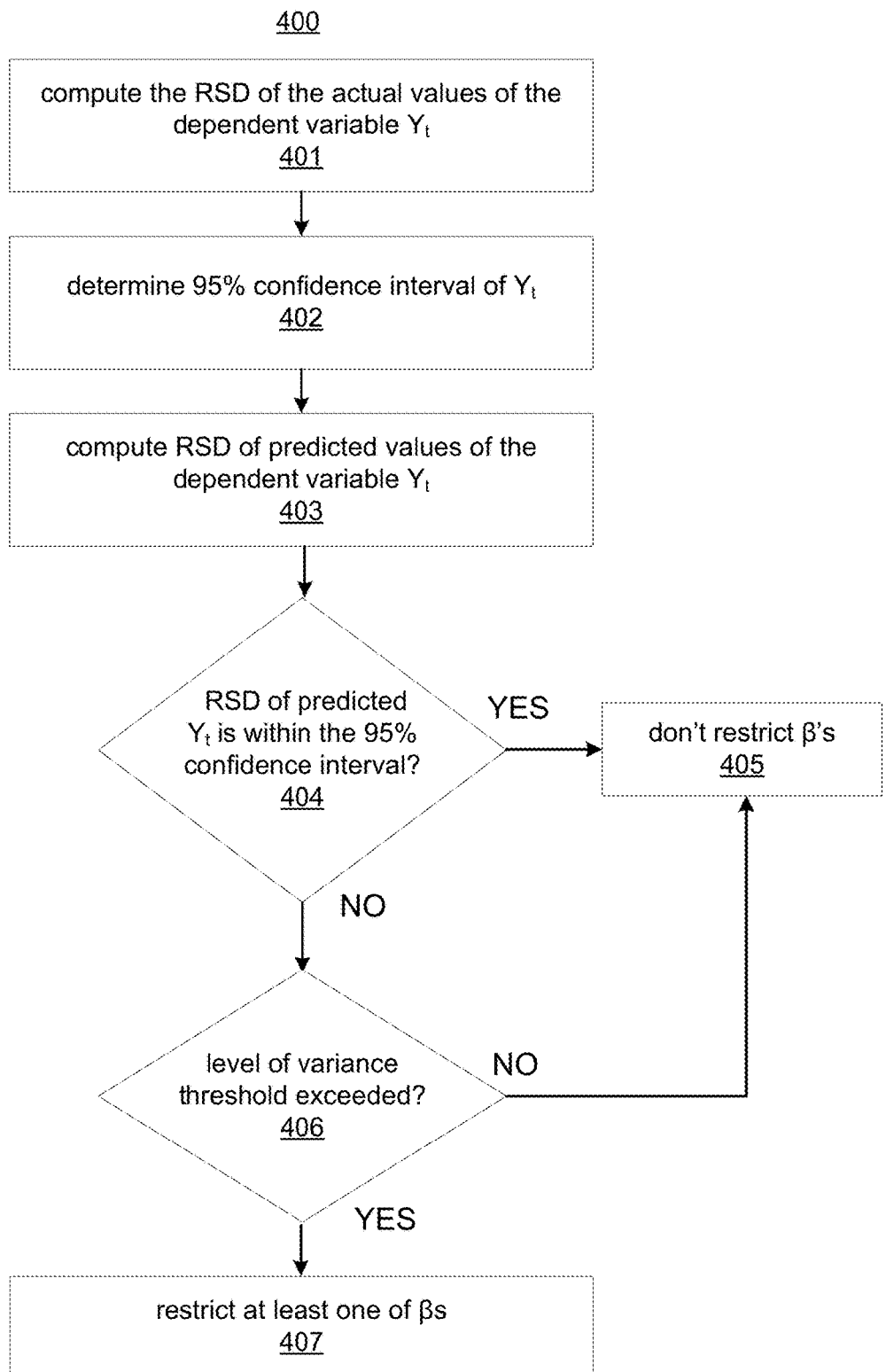
FIG. 4 illustrates a flow chart of an example of a method for restricting a time varying parameter.
Figure 5:
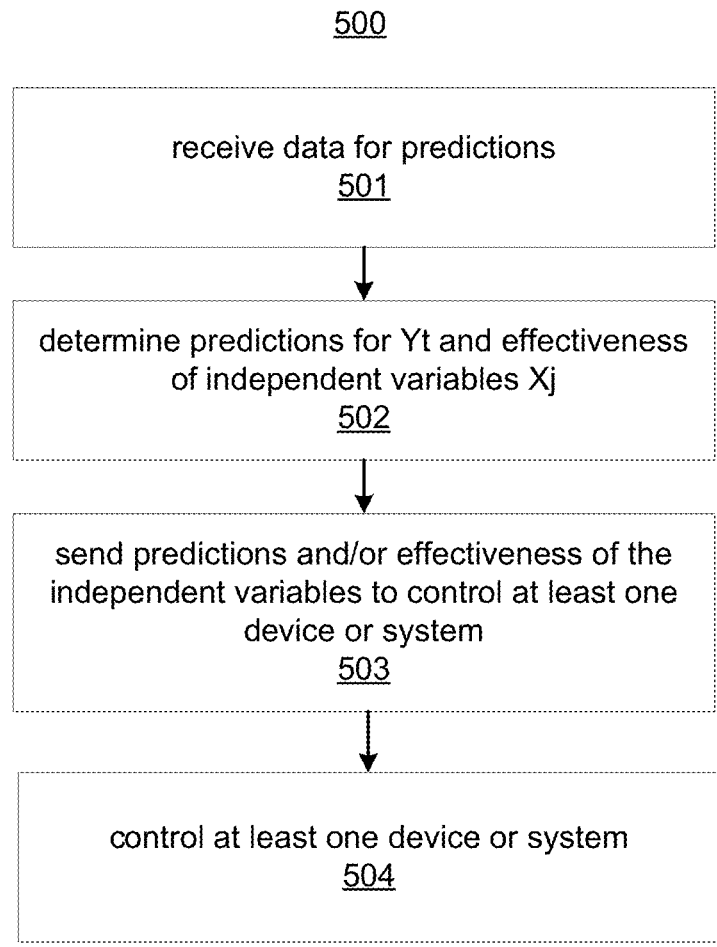
FIG. 5 illustrates a flow chart of an example of a method for applying a model.
Figure 6:
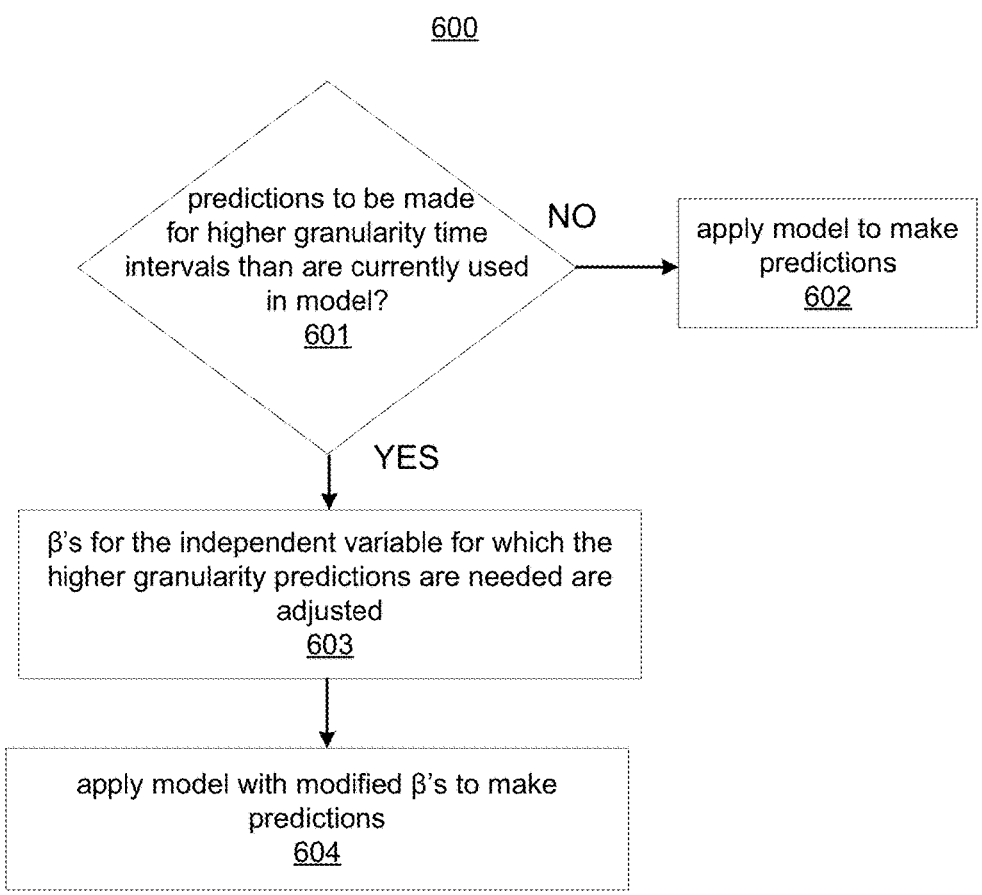
FIG. 6 illustrates a flow chart of an example of a method for determining predictions that may be for different granularity time intervals.

FIG. 4 illustrates an example of method 400 for restricting the variance of the $\beta$'s. The method 400 may be performed for the step 304 of the method 300. As discussed above, $\beta$ is calculated for each time period t, and may vary for each time period, which more accurately captures the changing effectiveness as opposed to using the same $\beta$ for each time period. However, varying $\beta$ for each time period creates the opportunity for overfitting. As discussed in the method 400, a variance in $\beta$ is computed to determine if the variance is greater than a threshold. If so, steps may be performed for determining whether a change to at least one of the $\beta$'s is warranted. Relative Standard Deviation (RSD), which is a modified standard deviation, may be used to measure the variance of the $\beta$'s. The RSD is defined as standard deviation normalized by its mean (or its absolute value). RSD may be used to determine whether a change to at least one of the $\beta$'s is warranted.

At 401, the RSD of the actual values of the dependent variable $Y_t$ is computed. For example, if t refers to a weekly time interval over a one year time period, the RSD is computed using the 52 data points of $Y_t$. The actual values for example are the measured values determined from the historic data.

At 402, a 95% confidence interval of $Y_t$ is determined based on the RSD determined at 401. In statistics, a confidence interval is a type of interval estimate of a population parameter. It is an observed interval (i.e., it is calculated from the observations), in principle different from sample to sample, that frequently includes the value of an unobservable parameter of interest if the experiment is repeated. How frequently the observed interval contains the parameter is determined by the confidence level or confidence coefficient. Confidence intervals consist of a range of values (interval) that act as good estimates of the unknown population parameter; however, the interval computed from a particular sample does not necessarily include the true value of the parameter. In statistics, when it is stated that "we are 99% confident that the true value of the parameter is in our confidence interval", it is being expressed that 99% of the hypothetically observed confidence intervals will hold the true value of the parameter. After any particular sample is taken, the parameter is either in the interval or not; it is not a matter of chance. The desired level of confidence may be set by a user. If a corresponding hypothesis test is performed, the confidence level is the complement of respective level of significance, i.e. a 95% confidence interval reflects a significance level of 0.05. The confidence interval contains the parameter values that, when tested, should not be rejected with the same sample. Greater levels of variance yield larger confidence intervals, and hence less precise estimates of the parameter. The 95% confidence interval may be calculated as follows:

$$\frac{K_0}{C_{n+1}+\left(Z_{1-\frac{a}{2}}\right)\sqrt{1-C_{n+1}^2}} \leq K_0 \leq \frac{K_0}{C_{n+1}-\left(Z_{1-\frac{a}{2}}\right)\sqrt{1-C_{n+1}^2}}$$

Where:
$K_0$=the sample RSD,
$Z_{1-\alpha/2}$=the $100(1-\alpha/2)$ percentile of the standard normal distribution, and
$C^2_{n+1}=1-1/2n+O(1/n^2)$, where O denotes the order of approximation.

At 403, the RSD of predicted values of the independent variable $Y_t$ is computed. For example, at 303, the $\beta$'s are determined for the independent variables $X_j$ and the time periods t. A validation data set is generated from historic data that includes values for $X_j$ and other parameters of Equation 1. The validation data set is different from the historic data set used to generate the model and determine the $\beta$'s at 303. The $\beta$'s determined at 303 are applied in the model to values of $X_j$ in the validation set to predict $Y_t$. The RSD of predicted values of the dependent variable $Y_t$ is determined.

At 404, a determination is made as to whether the RSD of the predicted $Y_t$ is within the 95% confidence interval. If yes, then, at 405, the $\beta$'s determined at 303 are not restricted for the associated independent variable and time period. If no, then, at 406, an amount of variation from the 95% confidence interval is compared to a level of variance threshold, which may correspond to an industry threshold, to determine whether the level of variance threshold is exceeded. For example, the amount of variation may be calculated as the difference between the RSD of the predicted $Y_t$ and the 95% confidence interval. If the level of variance threshold is exceeded (e.g., the amount of variation greater than the level of variance threshold), then, at 407, at least one of the β's determined at 303 is restricted to facilitate conformance with the level of variance threshold (e.g., less than or equal to the level of variance threshold). In an example, a 5% restriction is applied to the β's determined at 303. Applying a restriction on β, for example, includes restricting the variability of the β's. The restriction may be applied to all the β's, such as all the β's for a time period for which the model is generated, such as a 2 year time period including a β for each week of the 104 weeks. After restricting the β's, the predicted value is computed using all the βs and the RSD is compared. Accordingly, the restriction may be applied in a two-step procedure. For example, in a first step, the variance of the estimates without restriction for a driver in the model is determined. The variance of the estimated βs is computed. Let the variance be "X". In a second step, the βs are re-estimated using the bound of variation as "X" *0.95. Then, the restricted β's are included in the model, and the model is re-applied to the validation data set to predict $Y_t$. A determination is made as to whether a new RSD of the newly predicted $Y_t$ is less than or equal to the level of variance threshold. If yes, then the restricted β's are stored for the model, and if not, the process is repeated. This iterative process may be repeated until the RSD of the predicted $Y_t$ falls within upper and lower bounds. The bounds may be defined as follows:

Permissible Upper Value of RSD of the predicted $Y_t$=Max (Sales Upper RSD, Industry Standard Upper RSD); and Permissible Lower Value of RSD of the predicted $Y_t$=Min (Sales Lower RSD, Industry Standard Lower RSD).

The industry standard may refer to a threshold set by a group or organization of an industry associated with the variables in the model. As described above, if the level of variance threshold is exceeded, then at least one of the β's determined at 303 is restricted. In some instances, even if the level of variance threshold is exceeded, the β's are not restricted. For example, there may be an explainable cause for exceeding the level of variance, such as due to seasonal factors or some other factors. In those instances, the β's may not be restricted. User input may be received to indicate that the restriction is not needed or stored scenarios associated with explainable causes may be used to identify when the restriction is not needed.

The model 150 determined according to the methods 300 and 400, can be applied to predict $Y_t$. Method 500 describes applying the model. For example, referring to FIG. 2, the data received from the data source(s) 202 and processed by the data management module 208 may include current data for which predictions are to be made. This may include real-time data received from the systems and devices 120. At 501, data for which $Y_t$ is to be predicted is received. The data for example includes values for the independent variables $X_j$ and other parameters of Equation 1. At 502, the model applicator 252 applies the model 150 to predict $Y_t$. Also, a contribution or effectiveness of the independent variables for each of the consecutive time periods to $Y_t$ may be determined, for example, by computing $$\sum_{j=1}^{k} \beta_{jt} X_{jt}.$$

At 503, the predictions and/or effectiveness may be sent to the systems and devices 120, and at 504, the systems and devices 120 may control at least one device or system according to the predictions $Y_t$ and/or effectiveness of the independent variables. Instructions based on the predictions $Y_t$ and/or effectiveness of the independent variables may be sent to the systems and devices 120 instead of the actual predictions $Y_t$ and/or effectiveness of the independent variables. Examples of controlling at least one device or system are described above, such as with respect to manufacturing, and additional examples are described below.

The model 151 can be used to make predictions for consecutive time intervals that are larger than the successive time intervals of the time series historic data, which may be used to create the model. For example, if the successive time intervals of the time series historic data is hourly, the model may be used to make predictions for higher granularity time intervals, such as daily or weekly consecutive time periods. Method 600 describes a process for determining predictions that may be for different granularity time intervals. One or more of the steps of the method 600 may be performed at 502 of the method 500.

At 601, a determination is made as to whether the model 150 is to be applied for making predictions for higher granularity time intervals than are currently used in the model 150. The model 150 may be built for the time intervals of the historic data set used to build the model 150, such as described at 303 of the method 300. A user or a computer may provide input indicating the granularity of the time interval for which predictions are to be made. The input may come from the systems and devices 120 and may be for a higher granularity.

At 602, if the predictions are to be made for the same granularity of the time intervals of the stored time-series data used to build the model 150, then the model 150 is applied to make the predictions. If predictions are needed for a higher granularity time interval, then, in the model 150, the β's for the independent variable for which the higher granularity predictions are needed are adjusted at 603. At 604, the model 150 with the modified β's determined at 603 is applied to make the predictions for the higher granularity time intervals.

Method 700 describes one or more steps that may be performed at 604 to modify the β's for at least one of the independent variables to facilitate making the predictions for higher granularity time intervals. At 701, a best likelihood estimate, a best case estimate, and a worst case estimate is determined for the β's of the independent variable for which the higher granularity is needed and the time periods t. For example, a probability distribution of the β's is determined. Using Ordinary Least Squares (OLS), the best likelihood estimates are determined. Then, the predicted values for the β's are determined and used to compute the best case estimates and the worst case estimates.

In an example, the best case estimates are computed by calculating the point on a fitted probability distribution of the β's from the model 150 prior to modifying β's, which gives higher responsiveness compared to a most likely case. The formulae for the same is:

$$\Sigma P(X > \beta i(\text{Most Likely Estimate})) = 0.95,$$

where $\beta_i$ is the most likely estimate and P is the probability.

Similarly, the worst case estimates are computed by calculating the point on the fitted probability distribution which gives lower responsiveness compared to the most likely case. The formulae for the same is:

$$1/n \Sigma P(X < \beta i(\text{Most Likely Estimate})) = 0.95,$$

where $\beta_i$ is the most likely estimate. The process of determining the best and worst case estimates can be iterative, where the probability is reduced from 0.95 in steps till $\beta_i$ is estimated in both the best and worst case estimates. It starts with 0.95 as a statistical standard prescribed level of significance.

At 702, one of the best likelihood estimates, the best case estimates, and the worst case estimates of the $\beta$'s is used as the modified $\beta$'s applied at 604. In an example, the best likelihood estimates may be used as a default. However, user input may be received to select either the best case estimates or the worst case estimates.

According to an embodiment, the model 150 is used to estimate effectiveness of marketing drivers. For example, the independent variables $X_j$ each represent a measurable value for a marketing driver, $Y_t$ represents sales, and computing $$\sum_{j=1}^{k} \beta_{jt} X_{jt}$$

represents the effectiveness of the marketing drivers to contribute to sales.

A marketing driver may include a measurable activity for a particular marketing channel, such as activities for TV advertising, print media advertising, paid search, social media advertising, email advertising, etc. $X_j$ represents the measurable activities for the marketing drivers, such as gross rating point for television, impressions for paid search or social media advertising, etc. These measurable activities may also be referred to as marketing metrics.

The model 150 can provide an accurate estimate of each marketing driver's effectiveness by determining $\beta$'s for each time period, such as described with respect to the methods discussed above, and by facilitating predictions for fine-grained time periods. The model 150 may be used to estimate marketing driver contributions to sales for any time period as long as there is historical sales data for the time period.

Budget allocations for the marketing drivers can be determined based on the estimated driver contributions. Also, the visualization module 226 can provide an easy to understand graphical display of driver contributions to help determine the budget allocations and for making other marketing decisions including: whether money should be spent on the same drivers in the coming year; what is the most effective mix of drivers; when should the promotional activities begin for each driver and the duration the activities should be performed.

Applying the model 150 for marketing drivers and predicting sales, and for controlling a content delivery system based on sales predictions and driver effectiveness determined according to the model 150 is now described. As discussed above with respect to the methods 500-700, the model 150 may be built at the lowest granular level, e.g., hourly, which may be dependent on the granularity of the time series historic data used to build the model. However, a media planner might want to consider marketing advertisement decisions for some of the marketing drivers like online display or paid search at the hourly level, and some of the marketing drivers like email, at the daily level, and some others like e-catalog, at the weekly level. The systems and methods described herein facilitate the ability to apply the model 150 accordingly.

Figure 8:
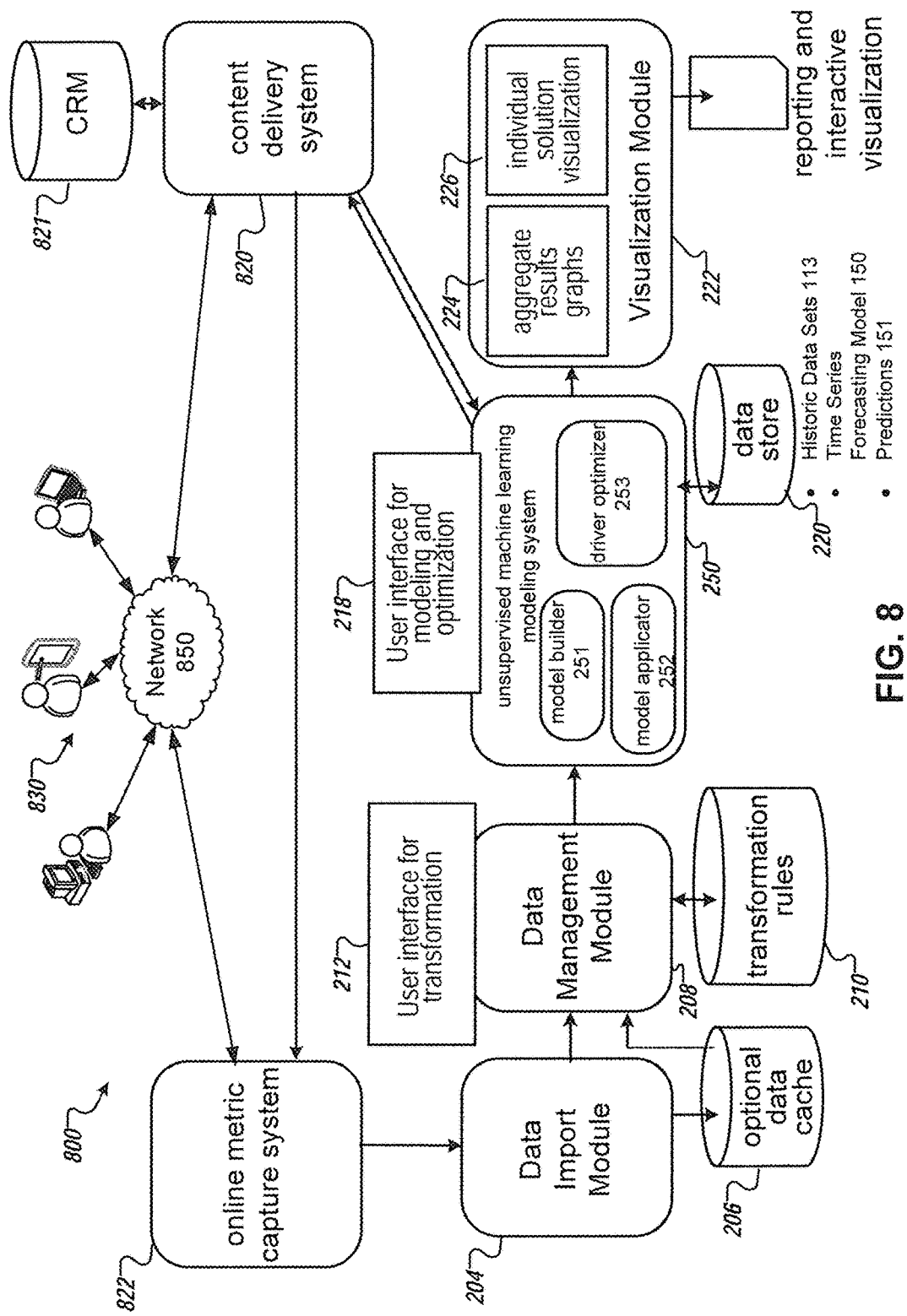
FIG. 8 illustrates an example of components of a system that can execute implementations of the present disclosure.

FIG. 8 shows system 800 for controlling content delivery based on predictions made by the model 150. The system 800 is generally the same as the system 200, but the systems and devices 120 comprises the content delivery system 820 and customer resource management database 821. Also, the source(s) 202 includes the online metric capture system 822 which measures and captures online metrics for marketing drivers. The online metrics may be measurements of online activities performed by the users 830 and which are associated with online marketing drivers, such as paid search, display advertisements (ads) or banner ads, email ads, social media marketing, text messaging ads, electronic catalogs (e-catalogs), etc. The online metrics may include click-throughs, impressions, sentiment, etc. The online content delivery system 820 may receive instructions from the system 250 that specify the content for the marketing drivers to be delivered to the users 830 via network 850 which may include the Internet. The instructions may be generated by driver optimizer 253, and the instructions may be determined based on predictions generated by the model 150 as is further discussed below. The online metric capture system 822 may be part of an overall system including the content delivery system 820 or may be a separate system.

Figure 9:
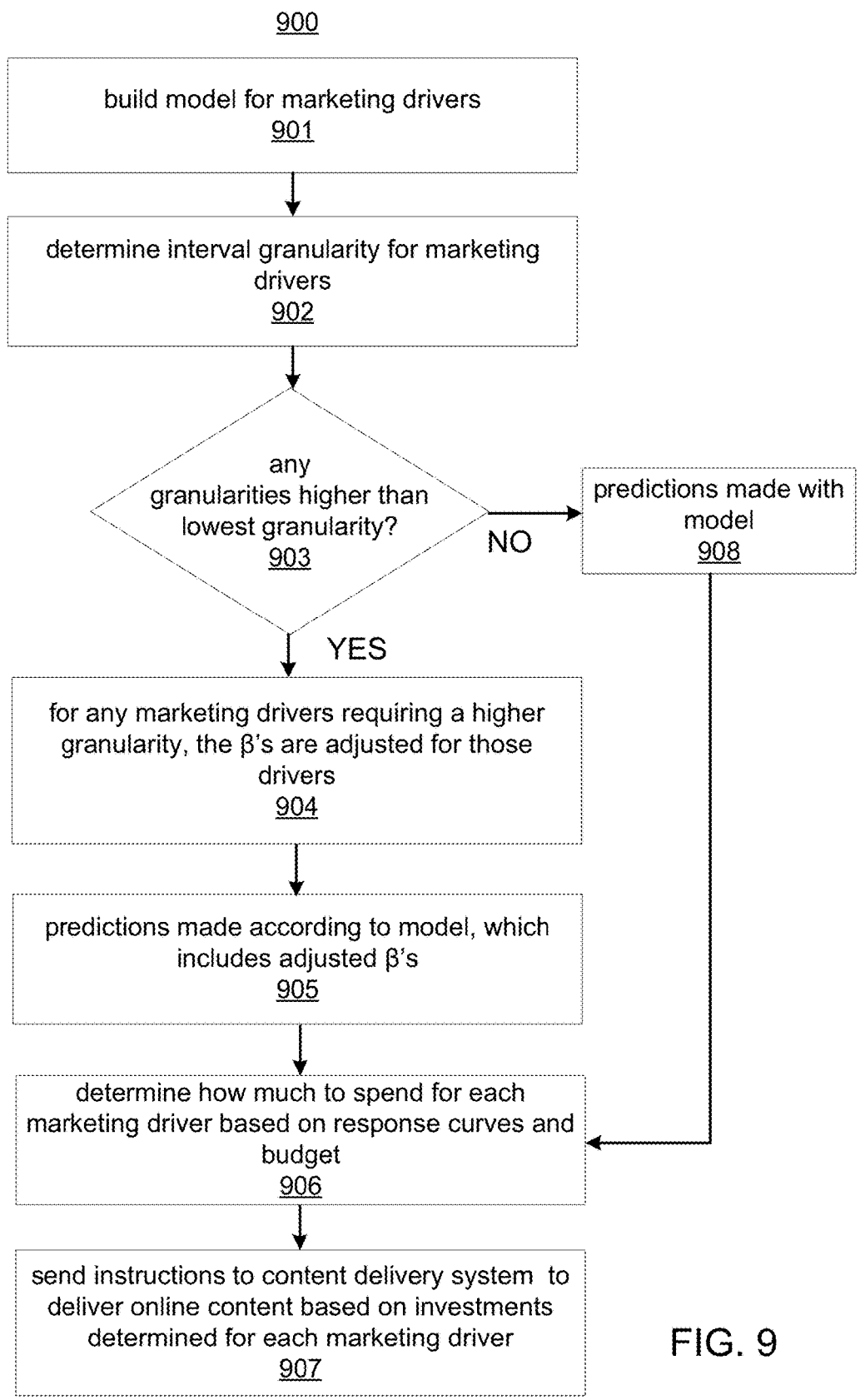
FIG. 9 illustrates an example of a flow chart of a method for managing content delivery based on predictions.

FIG. 9 shows a method 900 for managing content delivery based on predictions generated by the model 150, and the method 900 is described by way of example as being performed in the system 800. At 901, the model 150 is built for the marketing drivers, such as described with respect to the methods 300 and 400. In an example, a structural time series function, e.g., Equation 1 described above, may be used to generate the model 150. For example, the independent variables $X_j$ each represent a measurable value for a marketing driver and $Y_t$ represents sales.

$$\sum_{j=1}^{k} \beta_{jt} X_{jt}$$

represents the effectiveness of the marketing drivers. In an example, the marketing drivers may include display ads and paid search at the hourly level, online coupons and emails at the daily level, and e-catalogs.

At 902, an interval granularity is determined for the marketing drivers. In an example, a media planner needs to decide at what granularity of a time interval to optimize a marketing budget for the marketing drivers. For example, the media planner may choose to optimize display ads and paid search at the hourly level, emails at the daily level, and online coupons and e-catalogs at the weekly level. These selections may be received via the user interface 218.

At 903, a determination is made as to whether any of the granularities are higher than the lowest granularity for the marketing driver. For example, as described with respect to the methods 500-700 discussed above, the model 150 may be adjusted if predictions are required for higher granularity time intervals than the time intervals of the stored time-series data used to build the model 150. At 904, for any marketing drivers requiring a higher granularity, the $\beta$'s are adjusted for those drivers. For example, if predictions are to be determined for online coupons for the weekly level, but the model 150 has $\beta$'s for this marketing driver at the daily level, the $\beta$'s are adjusted for this marketing driver as discussed with respect to the method 700. As discussed above, multiple sets of new $\beta$'s may be determined for the most likelihood $\beta$'s, and best and worst case $\beta$'s. The system 250 may receive a selection of which set to use from the media planner or one set may be automatically selected, such as the most likelihood β's.

Figure 12:
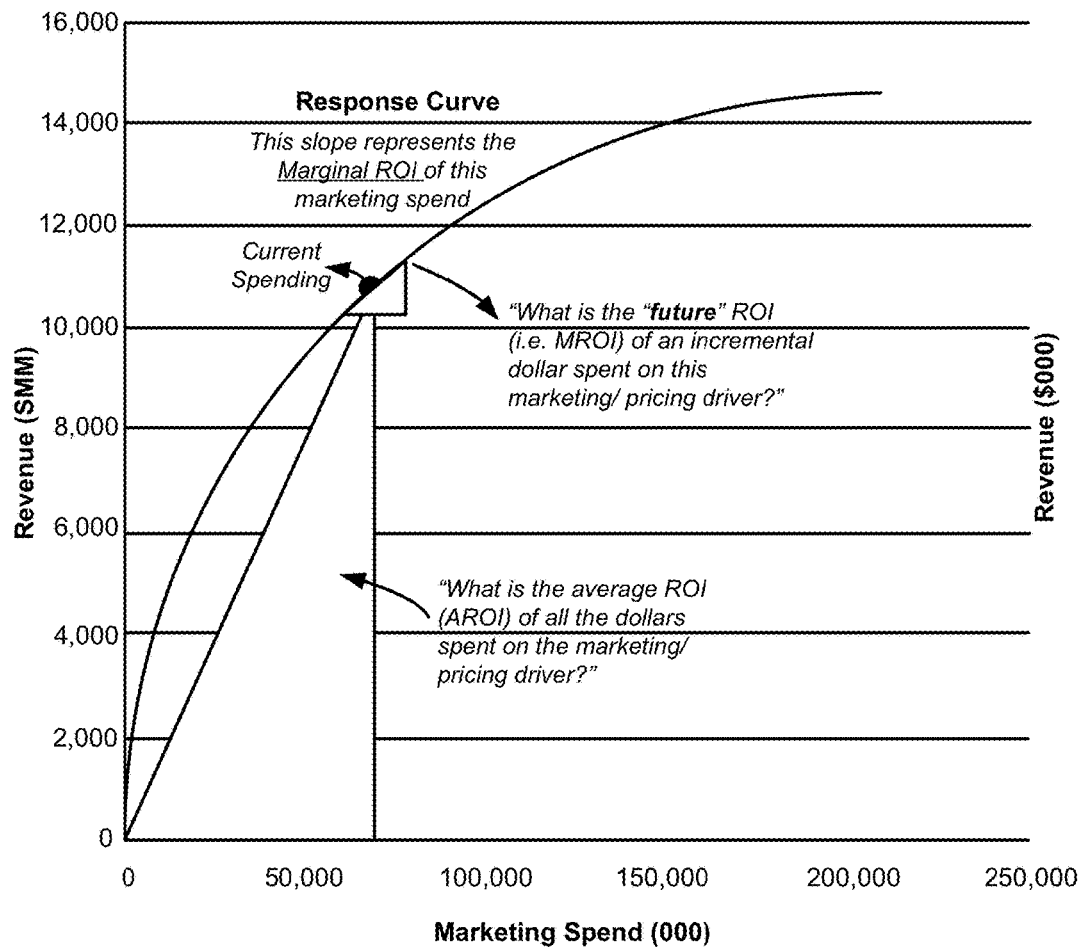
FIGS. 12-13 illustrate examples of response curves.

At 905, predictions are made according to the model 150, which may include the adjusted β's determined from 904. Alternatively, predictions are made by the current model, at 908, if predictions are not needed for higher granularities. For the predictions, for example, a response curve is computed for each marketing driver by the driver optimizer 253. Each response curve represents the incremental sales attributed to the particular marketing driver, which is a portion of the total sales $Y_t$. $\beta_{jt}X_{jt}$ is the incremental sales, also referred to as effectiveness, for the independent variable $X_j$. The online metric capture system 822 may capture online metrics for the marketing drivers, and these online metrics may be used to determine the incremental sales and generate the response curves. The response curves, for example, include incremental sales on the y-axis and investment in the marketing driver on the x-axis. The investment may be the monetary expenditure in the marketing driver. The response curves identify the point of diminishing returns of investments in the marketing drivers, and allow the user to understand whether investments in certain marketing drivers are saturated. An example of a response curve for a marketing driver is shown in FIG. 12. AROI (Average Return on Investment) is a measure of return from past investment while marginal ROI is a measure of return from future changes in investments and represented by the slope of the response curve. A response curve is determined by the relationship between marketing spending and marketing uplift using the modeling coefficients.

Figure 13:
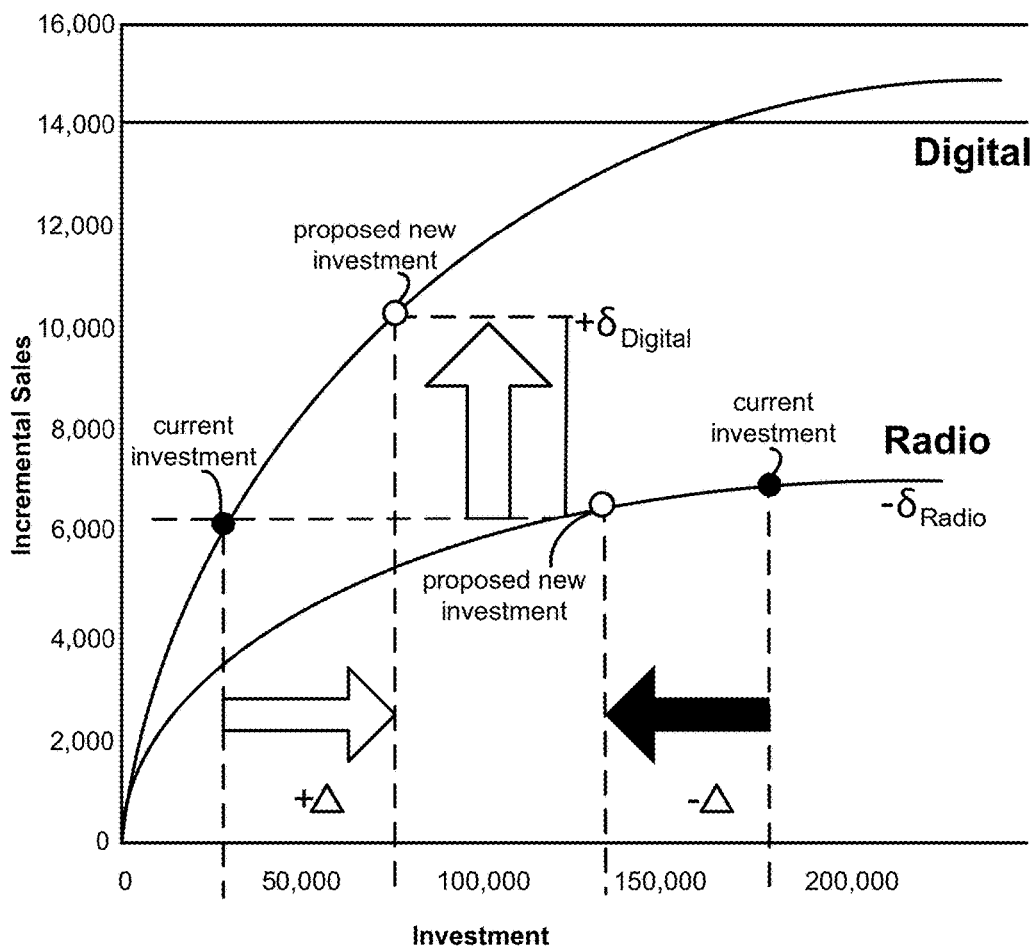

At 906, the driver optimizer 253 determines how much to spend for each marketing driver based on the response curves and a budget which may be received via the user interface, such as from the medial planner. The driver optimizer 253 may use the response curves as input for non-linear optimization to determine an amount of investment in the marketing drivers which maximizes the sales for the total investment budget. An example of the optimization is described with respect to FIG. 13, which shows response curves for the digital and radio marketing drivers. The digital marketing driver may include advertising through a social media application or on a website. FIG. 13 shows current spending or investment in the marketing drivers and a proposed change in spending as determined by the driver optimizer 253. The increase in returns due to higher spending in digital is more than the decline in returns due to decreased spending in radio, and it is determined that it is optimal to reallocate investment from radio to digital. The driver optimizer 253 for example determines that to maximize incremental revenue, investment should be moved from radio to digital. The optimization performed by the driver optimizer 253 may use a combination of marketing levers and constraints. Levers refer to potential combinations of investments in marketing drivers, and constraints are boundaries on the channel levers. The optimized budget and response curves may be presented by the visualization module 222 to the media planner via user interface 218. The media planner may select investments to implement based on the investments determined by the driver optimizer 253 and modify investments as desired. Also, the media planner can view an optimized budget for marketing drivers at the desired granularities (e.g., display ads and paid search at the hourly level, emails at the daily level, and online coupons and e-catalogs at the weekly level) via the user interface 218 to make investment decisions.

At 907, the driver optimizer 253 sends instructions to the content delivery system 820 to deliver online content based on the investments determined for each marketing driver at 906. Based on the investments for each marketing driver, the system 250 can determine locations (e.g., web pages and/or positions within web pages), times of displaying or sending ads, budget for bidding on placement for online ads, etc. This information may be included in instructions to the content delivery system 820 to control the delivery of ads to the users 830. In an example, the content delivery system 820 may include a bulk text message system that can send text messages to users 830 according to the instructions. The CRM database 821 may provide the addresses or phone numbers for the text messages to be sent. Similarly, the content delivery system 820 may include a bulk emailing system that can send emails to the users 830 based on instructions from the system 250.

Figure 10:
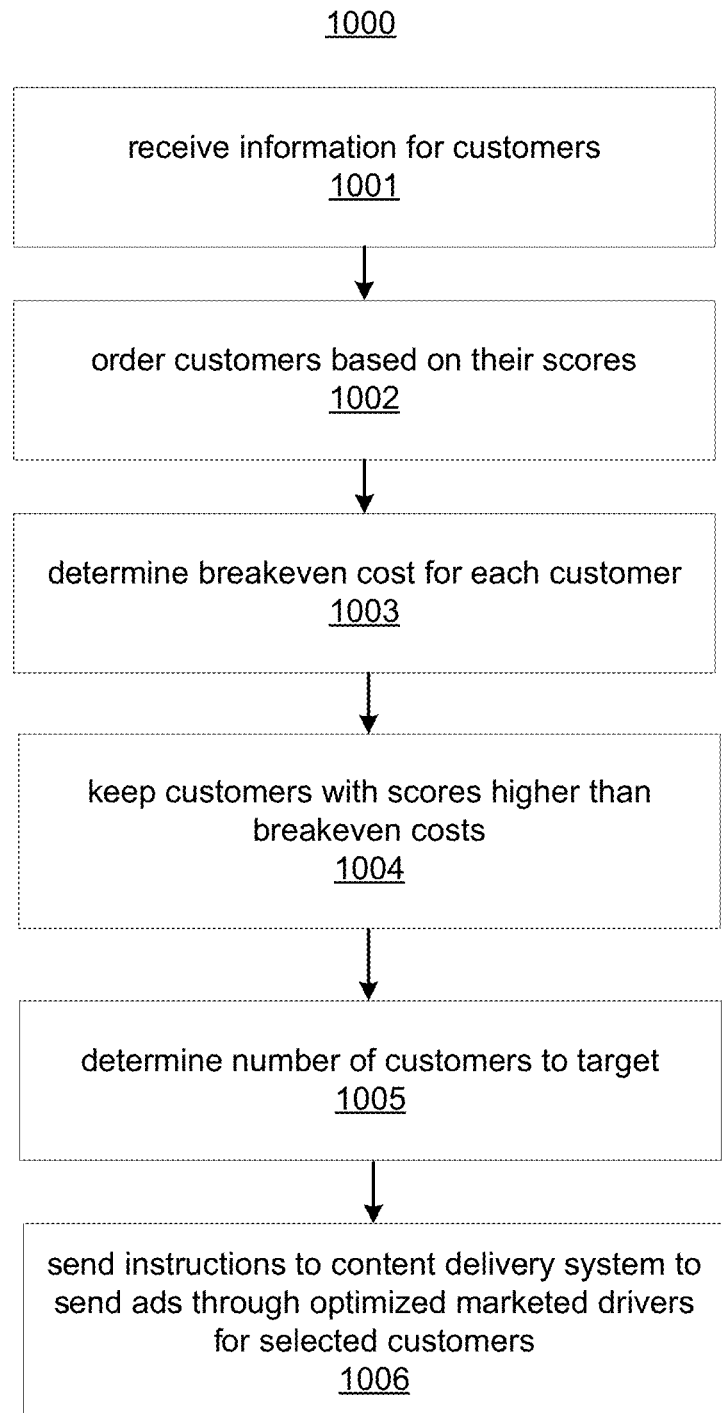
FIG. 10 illustrates an example of a flow chart of a method for automatically controlling a content delivery system.

FIG. 10 illustrates a method 1000 for automatically controlling the content delivery system 820 to target users 830 based on budget optimization. By way of example, the method 1000 may be performed by the system 250 shown in FIG. 8. Using hourly, daily, weekly optimized investments, such as determined at 906, customers may be selected for targeting according to a selected marketing driver. The customers to target may be determined based on purchase histories, which may be provided by the CRM 821, and breakeven costs.

At 1001, information for users is received for example from the CRM 821. The users may be customers. The CRM 821 may include a system that stores and tracks purchase histories and scores users. The users may be customers. An example of the information received may include the following:

| Customers | Purchase Intent Probability (A) | Purchased $ (B) | Score = A * B | Cost for Advertisement $ | Breakeven Cost (e.g., 1.5 times Cost) |
|---|---|---|---|---|---|
| Cust_1 | 0.9 | 1000 | 900 | 50 | 75 |
| Cust_5 | 0.7 | 400 | 280 | 50 | 75 |
| Cust_3 | 0.4 | 300 | 120 | 50 | 75 |
| Cust_2 | 0.2 | 200 | 40 | 50 | 75 |
| Cust_6 | 0.2 | 200 | 40 | 50 | 75 |
| Cust_4 | 0.1 | 200 | 20 | 50 | 75 |

At 1002, the customers are ordered based on their scores for example in descending order. At 1003, a breakeven cost is determined, e.g., 1.5 times of original cost of advertisement. At 1004, customers whose score is higher than the breakeven cost are kept, such as Cust_1, Cust_5 and Cust_3. At 1005, a number of customers to target is determined. For example, number of customers to target=optimized budget/ ad cost. If the number of customers to target is higher than the available customers with a higher score than their respective breakeven cost, then the additional budget may be used for other marketing drivers. At 1006, instructions are sent from the system 250 to the content delivery system 820 to send ads through the optimized marketed drivers for the customers selected as described above. In an example, the content delivery system 820 may be an existing CRM system, such as provided by Salesforce.com®, Infusionsoft®, Microsoft Dynamics®, etc., which automatically targets customers. For example, each time there is a change in the customer database or if there is any change in the customized emails or coupons, the content delivery system 820 automatically send emails or coupons to the customers.

It also has the flexibility to send emails and coupons with a time-interval of hours, days, weeks, etc. and also has an option to trigger sending through instructions, which in this case, are provided by the system 250.

Figure 11:
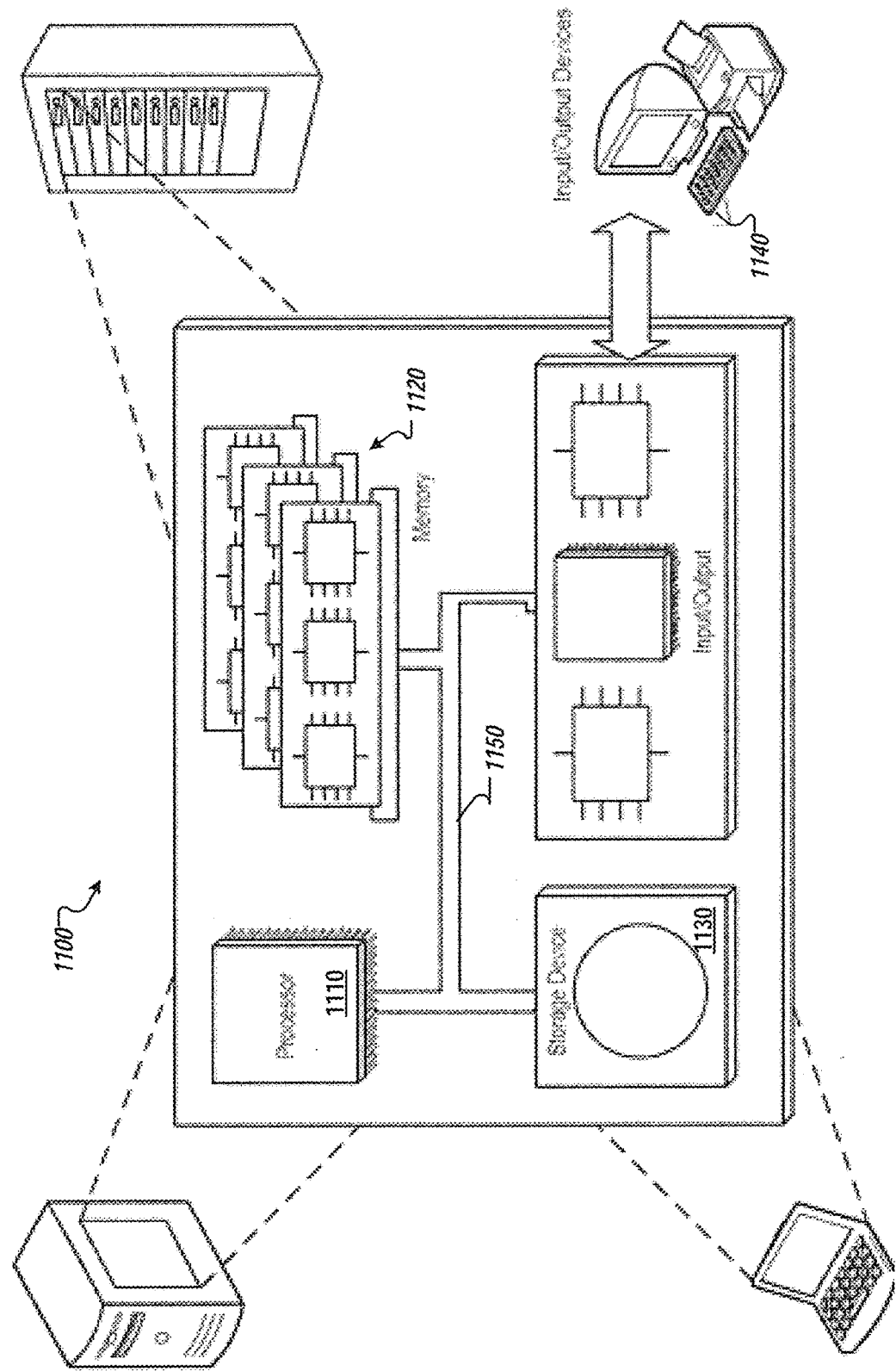
FIG. 11 is a schematic diagram of an example of a computer system that can be used for the operations described in association with the techniques described herein.

FIG. 11 is a schematic diagram of an example of a computer system 1100 that can be used for the operations described in association with the techniques described herein and for the systems described herein.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The processor 1110 and the memory 1120 may perform data manipulation and validation, including execution of data quality jobs.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The storage device 1130 may store monitoring data collected and data quality rule representations.

The input/output device 1140 provides input/output operations for the system 1100. In one implementation, the input/output device 1140 includes a keyboard and/or pointing device. In another implementation, the input/output device 1140 includes a display unit for displaying graphical user interfaces. The input/output device 1140 may be used to perform data exchange with source and target data quality management and/or processing systems.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A control system to control devices based on an unsupervised machine learning modeling, the control system comprising:
   an artificial intelligence server including at least one processor;
   a data storage system to store historic time-series data for independent variables and a dependent variable, and a time series forecasting model; and
   an unsupervised machine learning modeling system including machine readable instructions stored on a non-transitory computer readable medium and executed by the artificial intelligence server to:
   build the time series forecasting model from the stored historic time-series data according to an unsupervised machine learning function, wherein the time series forecasting model includes the independent variables from the stored historic time-series data and the dependent variable from the stored historic time-series data, and wherein the building of the time series forecasting model comprises:
  determining a time-varying parameter ($\beta$) for each of the independent variables and for continuous consecutive time intervals of the stored historic time-series data;
  restricting a variance of at least one of the $\beta$'s if overfitting for the time series forecasting model is estimated to occur; and
  for each of the independent variables, multiplying the independent variable with the time-varying parameter for the independent variable; and
apply the time series forecasting model to a data set, wherein the applying of the time series forecasting model includes:
  determining whether the time series forecasting model is to be applied for making predictions for higher granularity time intervals that are larger than the time intervals of the stored time-series data used to build the model;
  if the predictions are for the higher granularity time intervals, modifying the $\beta$'s for the independent variables to be for higher granularity time intervals;
  estimating a contribution of each of the independent variables for each of the consecutive time periods to the dependent variable; and
  controlling at least one device according to the estimated contributions of the independent variables.

2. The control system of claim 1, wherein restricting a variance of at least one of the $\beta$'s comprises:
  restricting the variance of at least one of the $\beta$'s based on a variation between actual values and predicted values of the dependent variable.

3. The control system of claim 2, wherein restricting the variance of at least one of the $\beta$'s based on a variation between actual values and predicted values of the dependent variable comprises:
  determining an actual values Relative Standard Deviation (RSD) of actual values of the dependent variable;
  determining a 95% confidence interval for the RSD of actual values of the dependent variable;
  determining a predicted values RSD of predicted values of the dependent variable;
  determining whether the predicted values RSD is within the 95% confidence interval;
  if the predicted values RSD is not within the 95% confidence interval, modifying at least one of the $\beta$'s for the independent variable for the time series forecasting model if a level of variance between the predicted values RSD and the 95% confidence interval exceeds a threshold; and
  if the predicted values RSD of the dependent variable is within the 95% confidence interval, the $\beta$'s for the independent variables are not modified.

4. The control system of claim 3, wherein modifying at least one of the $\beta$'s comprises:
  through an iterative process, restricting the $\beta$'s for the independent variables by a predetermined percentage until the predicted values RSD is within the 95% confidence interval or the level of variance between the predicted values RSD and the 95% confidence is less than or equal to the threshold.

5. The control system of claim 1, wherein modifying the $\beta$'s to be for higher granularity time intervals comprises:
  determining a best likelihood estimate, a best case estimate, and worst case estimate for each of the $\beta$'s for the higher granularity time intervals; and
  determining a probability for each of the best likelihood estimates, the best case estimates, and the worst case estimates; and
  using one of the best likelihood estimates, the best case estimates, and the worst case estimates of the $\beta$'s as the modified $\beta$'s.

6. The control system of claim 1, wherein modifying the $\beta$'s to be for higher granularity time intervals comprises:
  determining a probability distribution of the $\beta$'s;
  using Ordinary Least Squares (OLS) to determine the best likelihood estimates;
  calculating the predicted values for the $\beta$'s; and
  using the predicted values to compute the best case estimates and the worst case estimates.

7. A non-transitory computer readable medium comprising machine readable instructions executable by at least one processor to:
  determine an unsupervised machine learning function;
  build a time series forecasting model from historic time-series data according to the unsupervised machine learning function, wherein the time series forecasting model includes independent variables from the stored historic time-series data and a dependent variable from the stored historic time-series data, and wherein to build the time series forecasting model, the at least one processor is to:
    determine a time-varying parameter ($\beta$) for each of the independent variables and for continuous consecutive time intervals of the historic time-series data;
    restrict a variance of at least one of the $\beta$'s if overfitting for the time series forecasting model is estimated to occur; and
    for each of the independent variables, multiply the independent variable with the time-varying parameter for the independent variable; and
  apply the time series forecasting model to a data set, wherein the applying of the time series forecasting model includes:
    estimating a contribution of each of the independent variables for each of the consecutive time periods to the dependent variable; and
    controlling at least one device according to the estimated contributions of the independent variables.

8. The non-transitory computer readable medium of claim 7, wherein the machine readable instructions executable by the at least one processor to restrict a variance of at least one of the $\beta$'s are further to:
  restrict the variance of at least one of the $\beta$'s based on a variation between actual values and predicted values of the dependent variable.

9. The non-transitory computer readable medium of claim 8, wherein the machine readable instructions executable by the at least one processor to restrict the variance of at least one of the $\beta$'s based on a variation between actual values and predicted values of the dependent variable comprises are further to:
  for each independent variable:
    determine an actual values Relative Standard Deviation (RSD) of actual values of the dependent variable;
    determine a 95% confidence interval for the RSD of actual values of the dependent variable;

determining a predicted values RSD of predicted values of the dependent variable;

determine whether the predicted values RSD is within the 95% confidence interval;

if the predicted values RSD is not within the 95% confidence interval, modify at least one of the β's for the independent variable for the time series forecasting model if a level of variance between the predicted values RSD and the 95% confidence interval exceeds a threshold; and if the predicted values RSD of the dependent variable is within the 95% confidence interval, the β's for the independent variables are not modified.

10. The non-transitory computer readable medium of claim 9, wherein the machine readable instructions executable by the at least one processor to modify at least one of the β's are to:

through an iterative process, restrict the β's for the independent variables by a predetermined percentage until the predicted values RSD is within the 95% confidence interval or the level of variance between the predicted values RSD and the 95% confidence is less than or equal to the threshold.

11. The non-transitory computer readable medium of claim 7, wherein the machine readable instructions executable by the at least one processor to apply the time series forecasting model are to:

determine whether the time series forecasting model is to be applied for making predictions for higher granularity time intervals that are larger than the time intervals of the stored time-series data used to build the model;

if the predictions are for the higher granularity time intervals, modify the β's for the independent variables to be for higher granularity time intervals.

12. The non-transitory computer readable medium of claim 11, wherein the machine readable instructions executable by the at least one processor to modify the β's to be for higher granularity time intervals are to:

determine a best likelihood estimate, a best case estimate, and worst case estimate for each of the β's for the higher granularity time intervals; and determine a probability for each of the best likelihood estimates, the best case estimates, and the worst case estimates; and use one of the best likelihood estimates, the best case estimates, and the worst case estimates of the β's as the modified β's.

13. A non-transitory computer readable medium comprising machine readable instructions executable by at least one processor to:

determine an unsupervised machine learning function; and build a time series forecasting model from historic time-series data according to the unsupervised machine learning function, wherein the time series forecasting model includes independent variables from the stored historic time-series data and a dependent variable from the stored historic time-series data, and wherein to build the time series forecasting model, the at least one processor is to:

determine a time-varying parameter (β) for each of the independent variables and for continuous consecutive time intervals of the historic time-series data;

restrict a variance of at least one of the β's if overfitting for the time series forecasting model is estimated to occur; and for each of the independent variables, multiply the independent variable with the time-varying parameter for the independent variable; and apply the time series forecasting model to a data set, wherein to apply the time series forecasting model the at least one processor is to:

estimate a contribution of each of the independent variables for each of the consecutive time periods to the dependent variable;

determine whether the time series forecasting model is to be applied for making predictions for higher granularity time intervals that are larger than the time intervals of the stored time-series data used to build the model;

if the predictions are for the higher granularity time intervals, modify the β's for the independent variables to be for higher granularity time intervals; and control at least one device according to the estimated contributions of the independent variables.

14. The non-transitory computer readable medium of claim 13, wherein the machine readable instructions executable by the at least one processor to restrict a variance of at least one of the β's are to:

restrict the variance of at least one of the β's based on a variation between actual values and predicted values of the dependent variable.

15. The non-transitory computer readable medium of claim 14, wherein the machine readable instructions executable by the at least one processor to restrict the variance of at least one of the β's based on a variation between actual values and predicted values of the dependent variable are to:

determine an actual values Relative Standard Deviation (RSD) of actual values of the dependent variable;

determine a 95% confidence interval for the RSD of actual values of the dependent variable;

determine a predicted values RSD of predicted values of the dependent variable;

determine whether the predicted values RSD is within the 95% confidence interval;

if the predicted values RSD is not within the 95% confidence interval, modifying at least one of the β's for the independent variable for the time series forecasting model if a level of variance between the predicted values RSD and the 95% confidence interval exceeds a threshold; and if the predicted values RSD of the dependent variable is within the 95% confidence interval, the β's for the independent variables are not modified.

16. The non-transitory computer readable medium of claim 15, wherein the machine readable instructions executable by the at least one processor to modify at least one of the β's are to:

through an iterative process, restrict the β's for the independent variables by a predetermined percentage until the predicted values RSD is within the 95% confidence interval or the level of variance between the predicted values RSD and the 95% confidence is less than or equal to the threshold.

17. The non-transitory computer readable medium of claim 13, wherein the machine readable instructions executable by the at least one processor to modify the β's to be for higher granularity time intervals are to:

determine a best likelihood estimate, a best case estimate, and worst case estimate for each of the β's for the higher granularity time intervals; and determine a probability for each of the best likelihood estimates, the best case estimates, and the worst case estimates; and use one of the best likelihood estimates, the best case estimates, and the worst case estimates of the $\beta$'s as the modified $\beta$'s.

18. The non-transitory computer readable medium of claim 13, wherein the machine readable instructions executable by the at least one processor to modify the $\beta$'s to be for higher granularity time intervals are to:

determine a probability distribution of the $\beta$'s;

use Ordinary Least Squares (OLS) to determine the best likelihood estimates;

calculate the predicted values for the $\beta$'s; and use the predicted values to compute the best case estimates and the worst case estimates.

* * * * *